Oct. 12, 1943.　　　L. F. THOMPSON　　　2,331,581
EMERGENCY TIRE
Filed Feb. 25, 1942　　　2 Sheets-Sheet 1
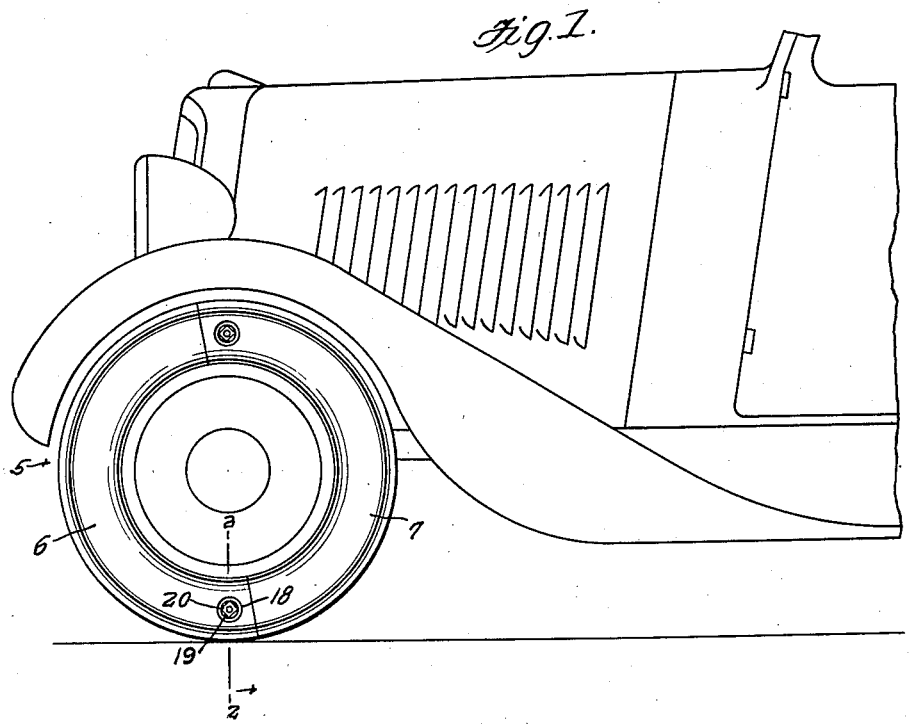
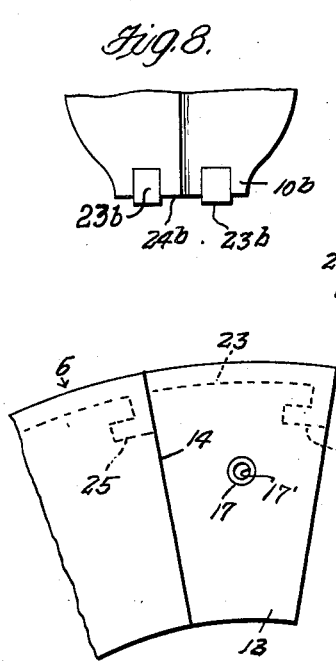
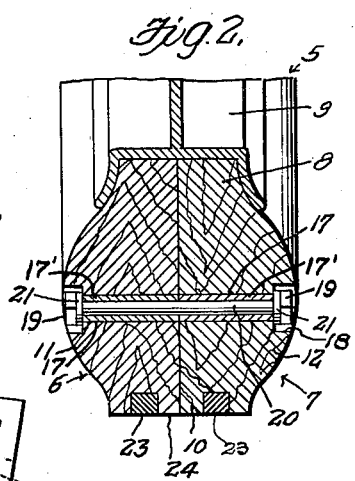
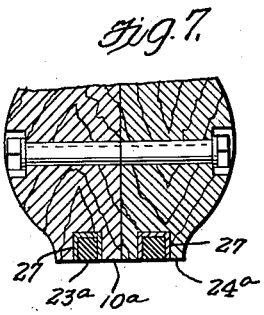
Inventor
Lyman Foster Thompson,
By Clarence A. O'Brien
and Harvey B. Jackson
Attorneys Oct. 12, 1943.  L. F. THOMPSON  2,331,581
EMERGENCY TIRE
Filed Feb. 25, 1942  2 Sheets-Sheet 2
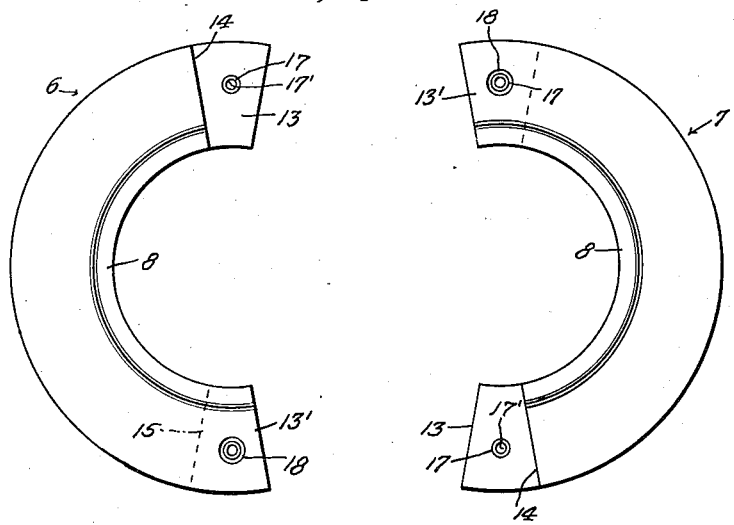
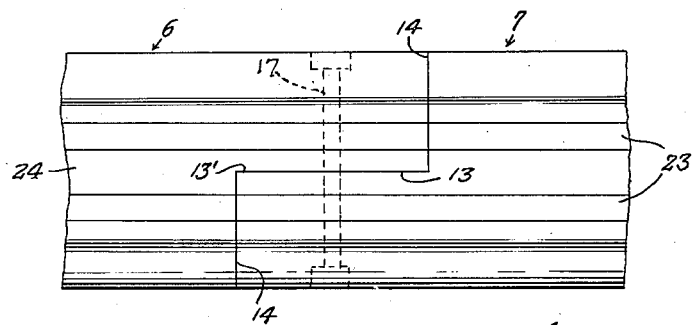
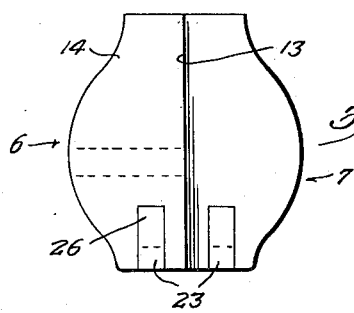
Inventor
Lyman Foster Thompson,
By Clarence A. O'Brien
and Harvey B. Jacobson
Attorneys Patented Oct. 12, 1943

2,331,581

UNITED STATES PATENT OFFICE 2,331,581

EMERGENCY TIRE

Lyman Foster Thompson, Fayetteville, Ark.

Application February 25, 1942, Serial No. 432,364

1 Claim. (Cl. 152—308)

The invention relates to improvements in emergency tires and has for its primary object to provide a practical, relatively noiseless, and simply constructed emergency tire for use on the rims on present automobile wheels in place of pneumatic tires.

Other important objects and advantages of the invention will be apparent from a reading of the following description taken in connection with the appended drawings, wherein for purposes of illustration preferred embodiments of the invention are shown.

In the drawings—

Figure 1 is an outboard elevational view of an automobile wheel equipped with an emergency tire in accordance with the present invention.

Figure 2 is an enlarged fragmentary transverse vertical sectional view taken through Figure 1 along the line 2—2.

Figure 3 is an expanded side elevational view of the tire showing the sections thereof separated.

Figure 4 is an enlarged fragmentary elevational view of the tread of the tire.

Figure 5 is an enlarged end elevational view of one of the sections.

Figure 6 is a fragmentary left hand side elevational view of Figure 5.

Figure 7 is a fragmentary transverse vertical sectional view similar to Figure 2 but taken through a modified form.

Figure 8 is a fragmentary end elevational view of one of the sections of a still further modified form.

Referring in detail to the drawings, the numeral 5 generally designates the preferred form of the present invention consisting of a tire made up of two semi-circular sections 6 and 7 which are constructed from wood or other similar material or may be of pressed or molded form, presenting on their radially inward side the curvedly reduced rim engaging portion 8 which conformably seats in the wheel rim 9, and the relatively flat tread portion 10, with the opposite sides bellied out as indicated by the numerals 11 and 12 in the manner of an ordinary pneumatic tire.

The sections 6 and 7 have the end portions thereof cut away at opposite sides to define the half section segmental laps 13 and 13' and the accompanying shoulders 14 and 15.

The laps 13 and 13' have transverse bores 17 therein which are lined by bushings or tubes 17'. The outer ends of the bushing equipped bores are sufficiently enlarged as indicated by the numeral 18 to rotatably receive a lug wrench (not shown) for operating the nuts 19 on the opposite ends of the assembling bolts 20 which are passed through the bushings 17' and equipped with lock washers 21 on their opposite ends which are held in place by the nuts 19. The enlarged bore portions 18 also act as countersinks for the heads of the bolts so that the heads of the bolts will not project out as far as the lateral extremities or side walls of the tire 5.

The tread portion 10 of the tire is equipped with at least two laterally spaced metal tires 23 which in the form of the invention shown in Figure 2 are countersunk flush with the tread surface 24. This arrangement enables the metal tires to retard the wear of the wood or other composition sections and to provide substantial non-skid and traction effects. The metal tires 23 are in substantially semi-circular portions conforming to the two sections 6 and 7, and the terminal ends of the tires are turned radially inwardly and return bent as indicated by the numerals 25 and 26, at the terminal ends of the sections 6 and 7 and countersunk therein flush with the surfaces through which they emerge, so as to reinforce the attachment of the tires and to provide suitable abutments for the similarly fashioned tire terminals on the assembled sections.

Another embodiment of the invention is similar in all respects to that above described except that the tires 23a may be rubber or other compressible composition bound by metal channels 27 set flush into the tread portion 10a as illustrated in Figure 7 of the drawings.

A still further form of the invention is illustrated in Figure 8 of the drawings wherein the tires 23b of either of the constructions described project beyond the surface 24b of the tread portion 10b of the tire forming sections instead of being flush with the surface 24a as in the above described embodiments.

Having described the invention, what is claimed as new is:

A tire comprising a pair of semi-circular sections of substantially rigid material having ends rabbeted from relatively opposite sides thereof to form overlapping end portions fitting together side by side and having radial circumferentially spaced abutment walls fitting together flush, said sections having bulging sides and flat treads, means to detachably attach the overlapping end portions together, and laterally spaced pairs of semi-circular tread members countersunk in the treads of the sections, respectively, the pairs of tread members having right angled inturned ends countersunk in the abutment walls of the end portions, the ends of each pair of sections fitting flush against the ends of the other pair, and semi-circular channel members set into said treads and straddling the said members.

LYMAN FOSTER THOMPSON.